United States Patent [19]

Noguchi et al.

[11] 4,438,543

[45] Mar. 27, 1984

[54] WINDSHIELD WIPER DEVICE

[75] Inventors: Hiroki Noguchi, Oobu; Akira Fukami; Naomi Miyazaki, both of Okazaki, all of Japan

[73] Assignee: Nippon Soken, Inc., Nishio, Japan

[21] Appl. No.: 287,122

[22] Filed: Jul. 27, 1981

[30] Foreign Application Priority Data

Sep. 18, 1980 [JP] Japan .................................. 55-129558
Nov. 6, 1980 [JP] Japan .................................. 55-156302

[51] Int. Cl.³ ................................................ B60S 1/04
[52] U.S. Cl. .................................................. 15/250.42
[58] Field of Search ........................... 15/250.36–250.42

[56] References Cited

U.S. PATENT DOCUMENTS 3,978,543 9/1976 Tomlin ............................ 15/250.42
4,360,941 11/1982 Mabie ............................ 15/250.42

FOREIGN PATENT DOCUMENTS 2417714 10/1975 Fed. Rep. of Germany ... 15/250.42
2232202 12/1974 France ............................ 15/250.42

*Primary Examiner*—Peter Feldman
*Attorney, Agent, or Firm*—Cushman, Darby & Cushman

[57] ABSTRACT

A windshield wiper device including a blade rubber, a backing holding the blade rubber in place, a support metal fixture including support claws for supporting the backing, an arm supporting the metal fixture, a spring loading the arm such that the blade rubber is forced against the windshield of a vehicle, and drive means connected to the arm for moving the arm, the metal fixture, the backing and the blade rubber in oscillating movement. The spacing interval between the adjacent two support claws is maximized at opposite end portions of the blade rubber and becomes smaller in going toward the center thereof, and a higher load is applied to the support claws near the central portion of the blade rubber than to the support claws near the opposite ends thereof, to thereby effectively avoid separation of the blade rubber from the surface of the windshield.

1 Claim, 6 Drawing Figures

WINDSHIELD WIPER DEVICE

BACKGROUND OF THE INVENTION

This invention relates to windshield wiper devices for vehicles, and more particularly it is concerned with a windshield wiper device which avoids separation of the wiper blade from the pane of the windshield when the vehicles travels at high speed.

A windshield wiper for wiping the pane of a windshield of a vehicle is exposed to the high pressure of winds when the vehicle travels at high speed. As a result, the wiper blade tends to separate itself from the pane during its reciprocatory movement, particularly during its return movement, across the surface of the windshield. This results in the surface of the windshield being unsatisfactorily wiped which blocks the line of sight of the driver, thereby seriously interfering with the manipulation of the vehicle by the driver. Separation of the wiper blade from the surface of the windshield, particularly during its return movement, is attributed to the fact that the velocity of the wind blowing against the wiper blade during its return movement is equal to the sum of the vehicle speed and the speed of oscillating movement of the wiper blade.

Various proposals have hitherto been made for avoiding separation of the wiper blade from the surface of the windshield. In one proposal, the resilient force of a spring of the windshield wiper device is increased, to increase the force with which the blade rubber is forced against the pane of the windshield. When such proposal is incorporated in a windshield wiper, frictional dragging of the blade rubber on the surface of the pane would naturally increase and it would necessary to use a powerful motor (of large size that consumes a great deal of electricity) for driving the wiper blade. In addition, when the vehicle travels at low speed or remains stationary or when it travels in drizzling weather, the windshield wiper would chatter when operated to wipe the pane, so that normal wiping of the pane would be unobtainable.

In another proposal known in the art, a vane-like member is attached to the support metal fixture or support arm of the blade to cause a force urging the blade rubber to press against the pane (reverse lift) to be produced from the pressure of the wind blown against the vane-like member, so that the produced force and a force tending to cause the blade to separate itself from the vane will cancel each other out. It would theoretically be possible to cause a force tending to urge the blade rubber to press against the pane which is commensurate with the velocity of the wind blown against the pane. However, the direction in which the wind blows in front of the windshield and the velocity of such wind are not uniform and simple but irregular and multitudinous, and the blade itself is not stationary but oscillates. Thus when the wiper is provided with the aforesaid vane-like member, it might be possible to achieve satisfactory results only when the angle of elevation thereof suits the prevailing conditions, but the vane-like member might be agitated by the wind when the vehicle speed and the direction of wind are unfavorable, with a result that the vane-like member might flap in the wind and the blade might separate itself from the surface of the windshield or chatter. Under such circumstances, it would be impossible to carry out a wiping operation satisfactorily. Also, when the vane-like member attached to the blade is large in size, visibility would become poor and an increase in the weight of the wiper would raise problems in fabrication and operation.

SUMMARY OF THE INVENTION

This invention has been developed for the purpose of obviating the aforesaid disadvantages of the prior art. Accordingly the invention has as its object the provision of a windshield wiper device, simple in construction, which is capable of effectively avoiding separation of the blade from the surface of the windshield during high speed operation of a vehicle.

According to the invention, there is provided a windshield wiper device comprising a blade rubber formed of resilient material, a backing holding the blade rubber in place, a support metal fixture comprising support claws for supporting the backing, an arm supporting the support metal fixture, a spring loading the arm to force the blade rubber against the surface of a windshield of a vehicle, and drive means connected to the arm for driving the arm, the support metal fixture, the backing and the blade rubber to move in oscillating movement, wherein the spacing interval between the adjacent two support claws is maximized at opposite end portions of the rubber blade and becomes smaller in going toward the center thereof, and a higher load is applied to the support claws near the central portion of the blade rubber than to the support claws near the opposite ends thereof, to thereby effectively avoid separation of the blade rubber from the surface of the windshield.

DESCRIPTION OF THE PREFERRED EMBODIMENT

Figure 1:
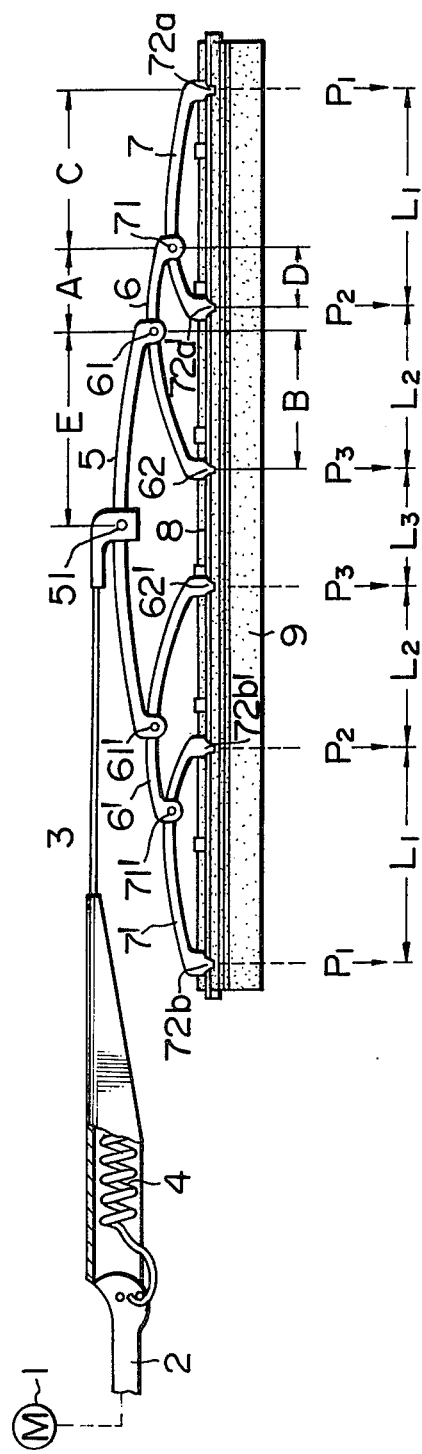
FIG. 1 is a front view, with certain parts being cut out, of the windshield wiper device comprising one embodiment of the invention.

In the windshield wiper device shown in FIG. 1, a wiper motor 1, a head 2 and a linkage, not shown, for connecting the wiper motor 1 to the head 2 constitute drive means. As is well known, the rotary movement of the wiper motor 1 is changed to a pivotal movement of the head 2 by the linkage. An arm 3 is connected at its rear end to the head 2 of the drive means, so that the pivotal movement of the head 2 causes the arm 3 to move in an oscillating fashion. Mounted between the head 2 and arm 3 is a spring 4 which by its biasing force loads the arm 3 in one direction with the connecting between the arm 3 and head 2 serving as a pivot. This direction is a direction in which a blade rubber subsequently to be described is forced against the pane of a windshield to maintain the former in intimate contact with the latter.

The arm 3 has at its forward end a support metal fixture comprising a primary lever 5 of an arcuate shape, a pair of secondary levers 6 and 6' of an arcuate shape and a pair of yokes 7 and 7' of an arcuate shape.

The primary lever 5 is pivotally connected at its central portion through a pin 51 to the forward end of the arm 3, and the secondary levers 6 and 6' are pivotally connected through pins 61 and 61' to opposite ends of the primary lever 5 respectively. The yokes 7 and 7' are pivotally connected through pins 71 and 71' to one end of the secondary levers 6 and 6' respectively. A backing 8 is supported by support claws 72a, 72a', 72b and 72b' of the yokes 7 and 7' respectively and by support claws 62 and 62' at one end of the secondary levers 6 and 6' respectively. A blade rubber 9 formed of resilient material is held in place by the backing 8.

The primary lever 5, secondary levers 6 and 6', yokes 7 and 7', backing 8 and blade rubber 9 move in an oscillating fashion together with the arm 3, so that the blade rubber 9 wipes the pane of the windshield while moving in oscillatory reciprocating movement thereon as the former is maintained in intimate contact with the latter by the biasing force of the spring 4.

Let the spacing intervals between the first pair of outermost support claws 72a and 72b and the second pair of support claws 72a' and 72b' disposed inwardly thereof, between the second pair of support claws 72a' and 72b' and the third pair of support claws 62 and 62' disposed inwardly thereof and between the third pair of support claws 62 and 62' be denoted by $L_1$, $L_2$ and $L_3$ respectively. The support claws 62, 62', 72a, 72a', 72b and 72b' are arranged such that $L_1 > L_2 > L_3$.

Let forces exerted on the first support claws 72a and 72b, the second support claws 72a' and 72b' and the third support claws 62 and 62' for forcing the blade rubber 9 against the pane of the windshield be denoted by $P_1$, $P_2$ and $P_3$ respectively. The spacing intervals A, B, C, D and E between the pins 61, 61' and the pins 71, 71', between the pins 61, 61' and the support claws 62, 62', between the pins 71, 71' and the support claws 72a, 72b, between the pins 71, 71' and the support claws 72a, 72b' and between the pins 61, 61' and the pin 51 respectively are set such that the following relation is satisfied:

$$\frac{P_3}{L_3} > \frac{\frac{1}{2}P_3 + \frac{1}{2}P_2}{L_2} > \frac{\frac{1}{2}P_2 + P_1}{L_1}.$$

The relations between the forces $P_1$, $P_2$ and $P_3$ exerted on the support claws and the spacing intervals A–E can be obtained by the following calculations:
W: load applied by spring 4.
$W_{61}$: load applied to pin 61.
$W_{71}$: load applied to pin 71.

$$W_{61} = \frac{W}{2} = W_{71} + P_3$$

$$P_3 = W_{61} \times \frac{A}{A+B}$$

$$W_{71} = W_{61} \times \frac{B}{A+B} = P_1 + P_2$$

$$P_1 = W_{71} \times \frac{D}{C+D}$$

$$P_2 = W_{71} \times \frac{C}{C+D}$$

The relations between the spacing intervals $L_1$, $L_2$ and $L_3$ and the spacing intervals A–E are as follows:

$L_1 = C + D$ $L_2 = A + B - D$ $L_3 = 2 \times (E - B)$

Figure 2:
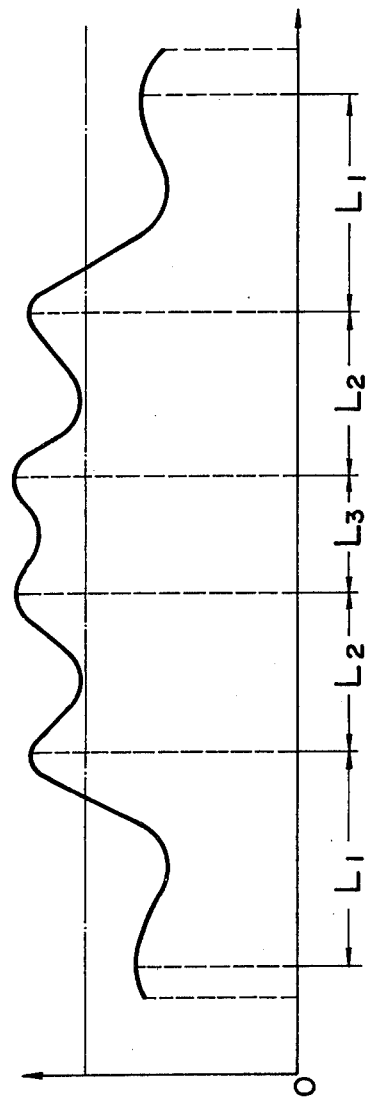
FIG. 2 is a diagrammatic representation of the distribution of a pressing force exerted on the blade rubber of the windshield wiper device shown in FIG. 1 to force same against the pane of the windshield when the vehicle is stationary or no wind is blown thereagainst, wherein the abscissa represents the positions of the blade rubber and the ordinate indicates the pressing force per unit length of the blade rubber.

In the embodiment shown in FIG. 1 which has the aforesaid construction, the load applied to the blade rubber 9 is distributed as shown in FIG. 2. It will be clearly seen in FIG. 2 that it is possible to effectively avoid separation of the blade rubber 9 from the pane of the windshield because a reduction in the pressing force exerted between the adjacent support claws is avoided and the pressing force in action in the central portion of the blade rubber 9 is higher than the average.

By referring to FIGS. 3–5, the wiper device shown in FIG. 1 according to the invention will be described in comparison with the prior art.

Figure 3:
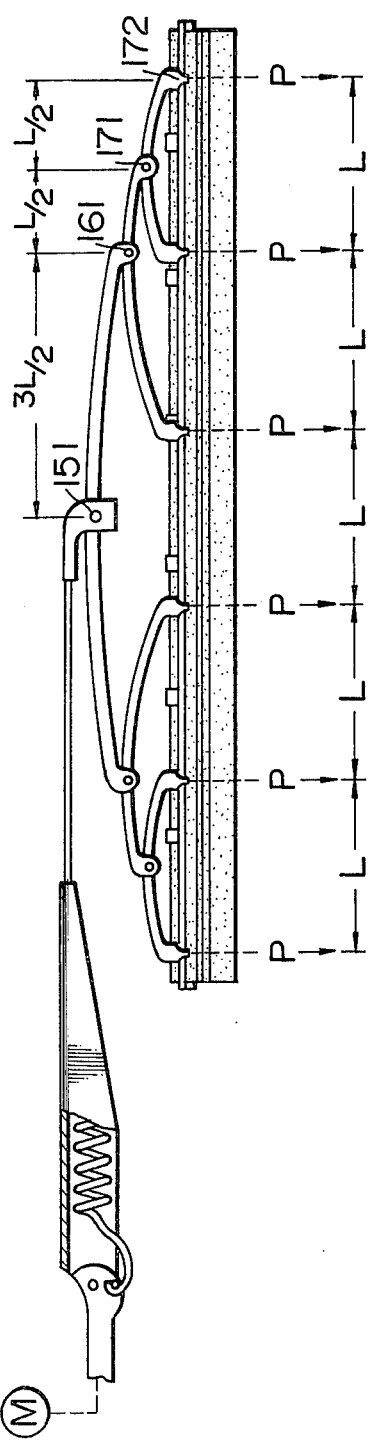
FIG. 3 is a front view, with certain parts being cut out, of a windshield wiper device of the prior art.
Figure 4:
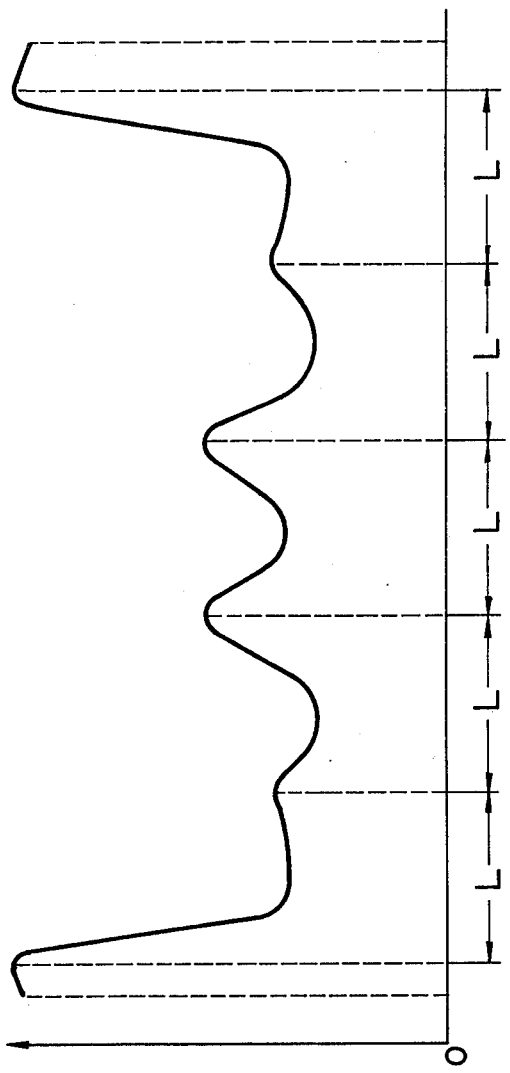
FIG. 4 is a diagrammatic representation of the distribution of a pressing force obtained with the windshield wiper device shown in FIG. 3, which is similar to the curve shown in FIG. 2.

FIG. 3 shows a windshield wiper device of the prior art wherein the spacing intervals between the support claws are substantially the same and the same load P is applied to all the support claws. More specifically, the wiper is symmetrical with respect to the pin 151 and the spacing intervals between the pins 151 and 161, between the pins 161 and 171 and between the pin 171 and the support claw 172 are 3L/2, L/2 and L/2 respectively. The pressing force exerted on the blade rubber of the wiper device of this construction is distributed as shown in FIG. 4 in which it will be seen that the pressing force exerted on either end of the blade rubber is inordinately high and the pressing force exerted on the central portion thereof is relatively low, so that there are possibilities of the blade rubber separating itself from the pane of the windshield when the vehicle travels at high speed. This is because the portion of the blade rubber supported by the support claws 172 at opposite ends is about ½ in length that of the portion supported by the other support claws. In this device, the pressing force is high at each support claw and low between the support claws, because the force exerted on the blade rubber via the support claws is only transmitted to portions of the blade rubber between the support claws through rigidity of the backing.

Figure 5:
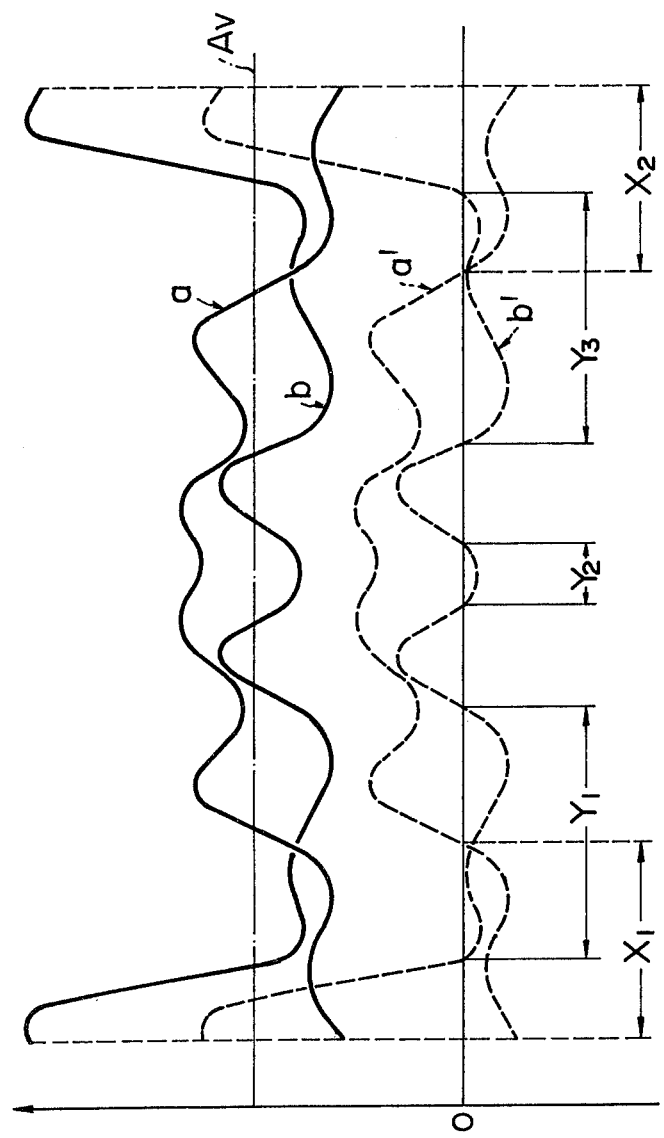
FIG. 5 is a diagrammatic representation of the pressing force distribution per unit length of the blade rubber obtained when the blade rubber is subjected to a lift by a current of air of high velocity when the vehicle travels at high speed, showing the manner in which the blade rubber of the windshield wiper device according to the invention behaves in comparison with the behavior of the blade rubber of the prior art.

Referring to FIG. 5, the wiper device according to the invention shown in FIG. 1 will be compared with the wiper device of the prior art shown in FIG. 3 with regard to the manner in which the blade rubber might be separated from the pane of the windshield when the vehicle travels at high speed.

In FIG. 5, a curve a is a pressing force distribution curve similar to the pressing force distribution curve shown in FIG. 2 representing the pressing force exerted on the blade rubber of the wiper device according to the invention when there is no wind. A curve b is a pressing force distribution curve similar to the pressing force distribution curve shown in FIG. 4 representing the pressing force exerted on the blade rubber of the wiper device of the prior art shown in FIG. 3 when there is no wind. A straight line $A_V$ represents the mean value of the pressing force represented by the curves a and b which is obtained by dividing the total pressing force by the total length of the blade rubber.

Curves a' and b' are pressing force distribution curves representing the pressing forces exerted on the blade rubbers of the wiper devices shown in FIGS. 1 and 3 respectively when a current of air of high velocity is blown against the wiper devices. It will be seen that in the wiper device according to the invention the blade rubber is only slightly separated from the pane at its opposite end portions alone as indicated by $X_1$ and $X_2$. In the wiper device of the prior art, however, the blade rubber is separated from the pane in several segments in the central portion of the blade rubber as indicated by $Y_1$, $Y_2$ and $Y_3$. The central portion of the blade rubber sweeps across a portion of the pane of the windshield which is disposed in front of the driver. Thus if the blade rubber is separated from the pane in this position, visibility would be greatly reduced. In addition, in the wiper device of the prior art, the total pressing force is not enough to keep the blade rubber in initimate contact with the pane. Thus the prior art device might suffer the disadvantage that the central portion of the blade rubber is separated from the pane in front of the driver due to inadequate distribution of the pressing force, when the vehicle travels at relatively low speed.

In the wiper device according to the invention, the pressing force is distributed smoothly to all the segments of the blade rubber. Although the blade rubber tends to be separated from the windshield at opposite ends thereof as indicated by $X_1$ and $X_2$ in FIG. 1, the separation is only of a slight nature and the blade rubber is positively maintained in pressing engagement with the windshield at its central portion which is the most important segment of the blade rubber, thereby permitting the phenomenon of complete separation of the blade rubber from the windshield to be avoided.

In the embodiment shown in FIG. 1, the positions of the pins A-E may be decided as follows. That is, when the pressing force exerted on the blade rubber 9 per unit length thereof to force the same against the windshield is distributed such that the distributed components of forces are designated by $W_1$, $W_2$, $W_3$, $W_4$ and $W_5$ starting at the left-most support claw 72b and going rightwardly in FIG. 1 to compare them in terms of the forces acting between the support claws, the following relation should be satisfied:

$$W_3 > W_2 > W_1 \text{ and } W_3 > W_4 > W_5.$$

And the spacing intervals $L_1$, $L_2$ and $L_3$ between the support claws and the forces $P_1$, $P_2$ and $P_3$ exerted on the support claws by the spring 4 by taking into account the reaction applied by the backing 8 as presently to be described should be decided in accordance with the positions of the pins.

The forces of component $W_1$, $W_2$, $W_3$, $W_4$ and $W_5$ may be expressed by the following equations:

$$W_1 = \frac{\frac{1}{2}(P_2 - f_2) + P_1 - f_1}{L_1}$$

$$W_2 = \frac{\frac{1}{2}(P_3 - f_3) + \frac{1}{2}(P_2 - f_2)}{L_2}$$

$$W_3 = \frac{P_3 - \frac{1}{2}(f_3 + f_4)}{L_3}$$

$$W_4 = \frac{\frac{1}{2}(P_3 - f_4) + \frac{1}{2}(P_2 - f_5)}{L_2}$$

$$W_5 = \frac{\frac{1}{2}(P_2 - f_5) + P_1 - f_6}{L_1}$$

where $f_1 \ldots f_6$ represent the reaction applied by the backing 8.

Figure 6:
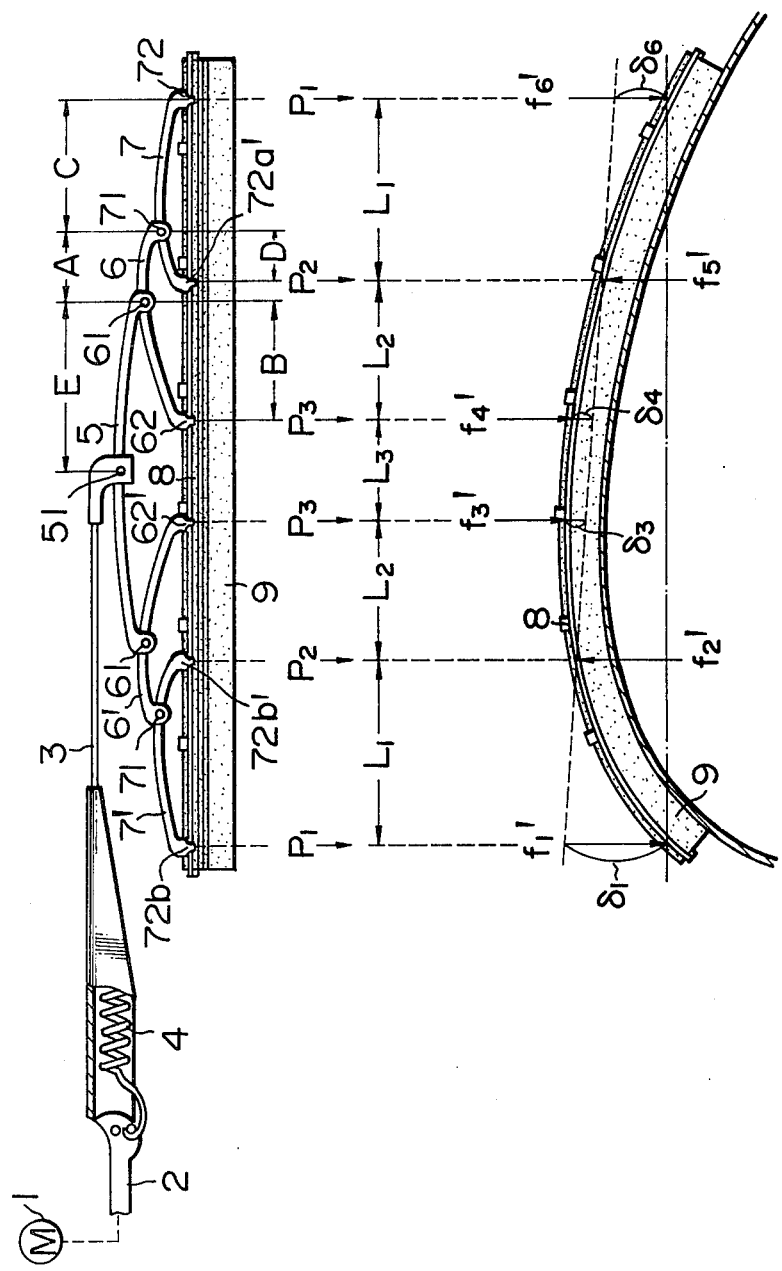
FIG. 6 is a front view of a blade rubber of the embodiment of the invention as it is forced against a curved pane of glass of an arbitrarily selected curvature.

A force necessary for bending the blade rubber 9 and the backing 8 to make the blade rubber 9 conform to the surface of the arbitrarily curved pane of the windshield as shown in FIG. 6 may be represented by $f'_1, f'_2 \ldots f'_6$ in the positions of the support claws from left to right in the figure.

Here, $f'_1, f'_2 \ldots f'_6$ may be considered to involve the problem of a statically indeterminate beam using a plane passing through the support claws $72a'$ and $72b'$ for the backing 8 as a reference surface and the positions of the support claws $72a'$ and $72b'$ as pivots.

If the distances between the reference surface at other support claws than those in the pivot positions and the curved surface of the vane are designated by $\delta_1$, $\delta_3$, $\delta_4$ and $\delta_6$, and if the bending rigidity of the backing 8 and the blade rubber 9 is denoted by $E_B I_B$ and $E_R I_R$ respectively, then the combined bending rigidity of the backing 8 and the blade rubber 9 is expressed by $EI = E_B I_B + E_R I_R$. As is well known, $E_B >> E_R$, so that $EI \approx E_B I_B$.

By taking into consideration the points referred to hereinabove and assuming that the problem of a statically indeterminate beam is involved, the relation between the support claws $72b$ and $72b'$ will be discussed in some detail. In FIG. 6, let the distance from the support claw $72b$ nearer to the head 2 be denoted by x, then the amount of deflection $y_1$ can be expressed by a known equation as follows:

$$y_1 = \frac{f_1 \cdot x^3}{6EI} + C_1 x + C_2$$

where $C_1$ and $C_2$ are integration constants.

Likewise, the amounts of deflection ($y_2$, $y_3$, $y_4$ and $y_5$) between the various support claws can be obtained, and each integration constant can be determined by each boundary conditions. Thus the amounts of deflection $y_1, y_2 \ldots y_5$ can be expressed as follows:

$$y_1 = h_1(f'_1, f_3, f_4, f_6, EI),$$

$$y_2 = h_2(f'_1, f_3, f_4, f_6, EI),$$

$$y_3 = h_3(f'_1, f_2, f_4, f_6, EI),$$

$$y_4 = h_4(f'_1, f_2, f_4, f_6, EI), \text{ and}$$

$$y_5 = h_5(f'_1, f_2, f_4, f_6, EI),$$

where $h_1, h_2 \ldots h_6$ are functions.

As shown in FIG. 6, the amounts of deflection in the positions of the support claws are given as $\delta_1$, ($\delta_2 = 0$), $\delta_3$, $\delta_4$, ($\delta_5 \equiv 0$) and $\delta_6$, so that the following relations hold in view of the aforesaid equations of deflection:

$$y_{1x=o} = \delta_1 = h_1(f'_1, f'_3, f'_4, f'_6, EI),$$

$$y_{3x=o} = \delta_3 = h_3(f'_1, f'_3, f'_4, f'_6, EI),$$

$$y_{4x=o} = \delta_4 = h_4(f'_1, f'_3, f'_4, f'_6, EI), \text{ and}$$

$$y_{5x=o} = \delta_6 = h_5(f'_1, f'_3, f'_4, f'_6, EI).$$

Thus a system of equations including four equations will hold with four unknown quantities. Also, since the moments of rotation on the left and right ends of the backing 8 are equal to each other, the following relation holds:

$$f'_1 \cdot (2L_1 + 2L_2 + L_3) + f'_3 \cdot (L_1 + L_2) + f'_4 \cdot (L_1 + L_2 + L_3) = f'_2 \cdot L_1 + f'_5 \cdot (L_1 + 2L_2 + L_3).$$

From the balancing of the vertically directed forces, the following relation holds:

$$f'_2 + f'_5 = f'_1 + f'_3 + f'_4 + f'_6.$$

Thus, the following equations can be obtained:

$$f'_2 = h_6(f'_1, f'_3, f'_4, f'_6), \text{ and}$$

$$f'_5 = h_7(f'_1, f'_3, f'_4, f'_6),$$

where $h_6$ and $h_7$ are functions. From the aforesaid system of four equations and the equations for $f'_2$ and $f'_5$, $f'_1, f'_2 \ldots f'_6$ can be obtained as follows:

$$f'_1 = g_1(\delta_1, \delta_3, \delta_4, \delta_6, EI),$$

$$f'_2 = g_2(\delta_1, \delta_3, \delta_4, \delta_6, EI),$$

$$f'_3 = g_3(\delta_1, \delta_3, \delta_4, \delta_6, EI),$$

$$f'_4 = g_4(\delta_1, \delta_3, \delta_4, \delta_6, EI),$$

$$f'_5 = g_5(\delta_1, \delta_3, \delta_4, \delta_6, EI), \text{ and}$$

$$f'_6 = g_6(\delta_1, \delta_3, \delta_4, \delta_6, EI),$$

where $g_1, g_2 \ldots g_6$ are functions. Also, EI may vary depending on the shape and material of the backing 8, and $\delta_1, \delta_3, \delta_4$ and $\delta_6$ can be obtained based on the shape of the windshield pane. As a result, a force necessary for bending the backing 8 and blade rubber 9 of $f'_1, f'_2, f'_3, f'_4, f'_5$ and $f'_6$ can be obtained.

Here, $f'_1, f'_2 \ldots f'_6$ can be obtained with the directions indicated by arrows in FIG. 6 as being positive, so that the reaction of the backing 8 can be obtained as $f_1 = f'_1, f_2 = -f'_2, f_3 = f'_3, f_4 = f'_4, f_5 = -f'_5$ and $f_6 = f'_6$.

As described in detail hereinabove, an optimum force is exerted on the backing 8 and blade rubber 9 in the wiper device according to the invention so that they will conform to the curved surface of an arbitrarily selected windshield pane. Thus it is possible to improve the performance of the wiper device in avoiding separation of the blade rubber from the windshield pane by avoiding a reduction in the pressing force exerted on the spacing between the support claws and applying a higher-than-average pressing force to the central portion of the blade rubber.

In actual practice, the distribution of the pressing force exerted on the blade rubber 9 of the wiper device according to the invention is represented by a curve a as shown in FIG. 5 to facilitate comparison with the curve b representing the pressing force obtained with the wiper device of the prior art and its mean value is represented by a straight line Av. The pressing force exerted on the blade rubber 9 as a current of air of high velocity is blown against the blade when the vehicle travels at high speed is represented by a curve a' and the segments $X_1$ and $X_2$ of the blade rubber 9 are separated from the windshield pane. As compared with the blade rubber of the prior art which separates itself in the segments $Y_1$, $Y_2$ and $Y_3$ which are located in the central portion of the blade rubber, it will be seen that separation takes place only at opposite end portions of the blade rubber 9 that overlap small portions of the segments $Y_1$ and $Y_3$ in front of the driver, the line of sight of the driver is little interferred with.

In the embodiment shown and described, the $L_1$ on the right side of FIG. 2 and the $L_1$ on the left side thereof are equal to each other. However, they may be slightly different and it is not necessary that the blade rubber be symmetrical with respect to the pin 51. What is essential is that the pressing force is distributed such that it becomes higher in going from opposite ends of the blade rubber toward its center so that the central portion of the blade rubber will be forced against the pane with a higher force while the pressing force is reduced in going toward the opposite end portions of the blade rubber.

What is claimed is:

1. A windshield wiper device comprising:
   a blade rubber formed of a resilient material;
   a backing holding said blade rubber in place;
   an arm;
   drive means for driving said arm;
   a primary lever pivotally attached at its central portion to an end of said arm;
   a pair of secondary levers pivotally attached to opposite ends of said primary lever, each of said secondary levers having a third support claw at one end for supporting said backing;
   a pair of yokes, one pivotally attached to the other end of each of said secondary levers, respectively, each of said yokes having at opposite ends first and second support claws for supporting said backing, each said first support claw being disposed outwardly from the center of said blade rubber with respect to said second support claw; and
   a spring for loading said arm to force said blade rubber against the surface of a windshield of a vehicle,
   wherein said primary lever, said pair of secondary levers and said pair of yokes are arranged such that the load applied to said blade rubber is selected to satisfy the following relations (1) and (2):

$$L_1 > L_2 > L_3 \tag{1}$$

$$W_1 < W_2 < W_3 > W_4 > W_5 \tag{2}$$

where $$W_1 = \frac{\frac{1}{2}(P_2 - f_2) + P_1 - f_1}{L_1},$$

$$W_2 = \frac{\frac{1}{2}(P_3 - f_3) + \frac{1}{2}(P_2 - f_2)}{L_2},$$

$$W_3 = \frac{P_3 - \frac{1}{2}(f_3 + f_4)}{L_3},$$

$$W_4 = \frac{\frac{1}{2}(P_3 - f_4) + \frac{1}{2}(P_2 - f_5)}{L_2},$$

-continued $$W_5 = \frac{\frac{1}{2}(P_2 - f_5) + P_1 - f_6}{L_1},$$

$L_1$: spacing interval between said first and second support claws of each of said yokes;

$L_2$: spacing interval between each of said second support claws and a closest one of said third support claws, $L_3$: spacing interval between said third support claws, $P_1$: load applied to said first support claws, $P_2$: load applied to said second support claws, $P_3$: load applied to the third support claws, and $f_1$-$f_6$: reactions applied by said backing.

* * * * *